Oct. 4, 1949.   LA VERN E. QUINNELL   2,483,983
FLAT DRY CELL BATTERY
Filed Oct. 11, 1946

Inventor:
LaVern E. Quinnell
By Clarence J Loftus
Atty

Patented Oct. 4, 1949

2,483,983

UNITED STATES PATENT OFFICE 2,483,983

FLAT DRY CELL BATTERY

La Vern Edward Quinnell, Fort Wayne, Ind., assignor to The Magnavox Company, Fort Wayne, Ind., a corporation of Delaware Application October 11, 1946, Serial No. 702,809

3 Claims. (Cl. 136—111)

The present invention relates to improvements in dry cells and dry cell batteries and a method of constructing such cells and batteries.

A primary object of this invention is to provide a cell structure having such action that corrosion and other hazards caused by electrolytes and cell structures do not occur.

Another object is to provide a structure which facilitates interlocking of the casing with the cells.

The subject matter disclosed herein covers improvements on, but is generally similar to, that disclosed in the application of Judson West, Jr., and Charles E. Van Hoy entitled "Dry cell battery." The subject matter disclosed herein but not claimed herein is claimed in said application, Serial No. 702,510. The structure claimed herein may be employed not only with the structure disclosed in said application, but also in other battery structures to fulfill the above-mentioned objects.

Further objects and advantages will be apparent from the description and the appended claims.

The features of the invention will be more clearly understood by reference to the accompanying drawings and the following description thereof:

Figure 1:
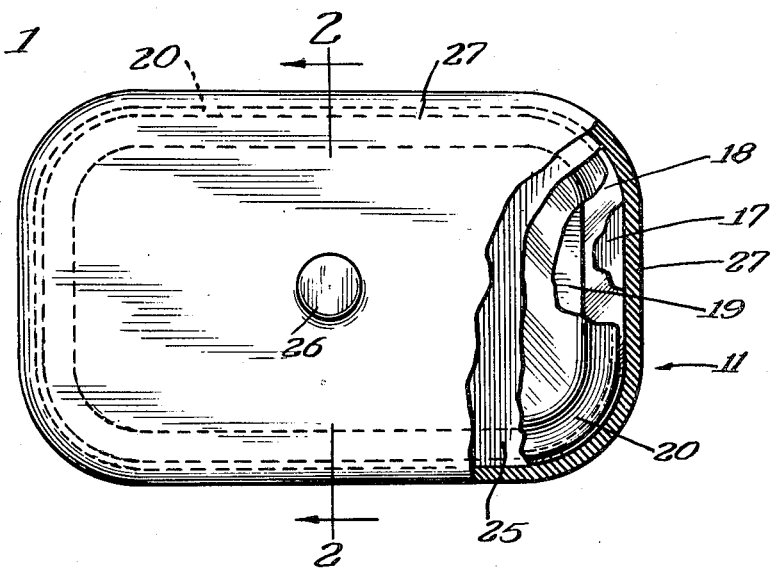
Figure 1 is a perspective view, partly in section, showing the casing of a dry cell broken away.

The novel battery 11, illustrated in the drawings, comprises at least one cell and preferably a multiplicity of cells, such as cells 12, 13, 14 and 15. Each cell, for example cell 12, consists of a terminal member or current collector 16, a combined cathode and depolarizer 17, a dialysis or ion-permeable membrane 18, a combined electrolyte-anode wafer 19, and a barrier or current-collecting member 20 of a material, such as zinc, that does not electrochemically react with the anode material. The end terminal member 16 has an integral central boss 21 and differs in that respect from the corresponding current collector members 22, 23 and 24. The other end terminal 25 is identical to terminal member 16 and has an integral boss 26. Each current collector member presents a flat, generally rectangular face to the adjacent member or members, the corners preferably being rounded, as clearly shown in Fig. 1. The multi-cell assembly is encased in a housing or casing 27. This provides a simple construction in which each cell touches the adjacent one to provide electrical connection in series.

The current collector 16 is iron. The cathode depolarizer 17 may be composed of about 90 to 93 per cent mercuric oxide and about 10 to about 7 per cent of graphite by weight. The membrane 18 is preferably of thin high grade parchment paper, a satisfactory thickness having been found to be of the order of .006". The electrolytic-anode wafer 19 may be of a gelatinous mixture, comprising by weight 17 to 20 parts of alkali metal hydroxide, 50 to 70 parts of zinc, 6 to 10 parts of a gelling agent such as carboxy methyl cellulose and salts of carboxy methyl cellulose, 20 to 30 parts of water and, if desired, 2 to 4 parts of zinc oxide. The casing 27 can be of microcrystalline wax.

Figure 2:
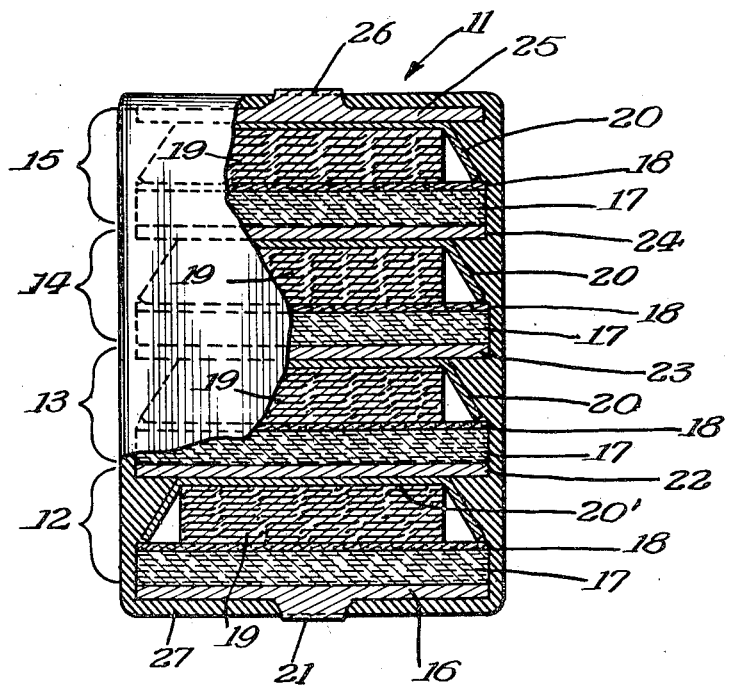
Fig. 2 is a sectional view taken along line 2—2 of Fig. 1.

In prior construction of multi-cell batteries it has been the practice to maintain such batteries in assembly by tapes and the like. Such construction provides creeping paths or bridges for the conventional electrolyte and permits it to pass between cells. This action results in the formation of high resistance junctions between cells, caused by corrosion. In the invention described in the aforementioned copending application of West and Van Hoy this "bridging" action of the electrolyte between cells is substantially retarded by a novel construction of the electrolyte. To further prevent any possibility of creeping action, the present invention provides extended barriers or inverted cup members 20 as shown in Fig. 2. In the copending application of West and Van Hoy the invention broadly discloses barriers positioned between the electrolyte-anode wafers 19 and any adjacent cell. In the present invention in their preferred embodiment these barriers 20 comprise thin sheets of zinc cut to size and shaped to form inverted cups the sides or marginal surfaces of which extend away from the electrolyte to a point substantially coextensive with the outer edges of the ion-permeable membrane 18. The sides of the cups or depending flanges 20 thus provide a longer path of travel for the electrolyte than found with plane-surfaced barriers. Further, when in the assembly of a multi-cell battery the cells are clamped together and held in position by casing 27, cup shapes or flanges 20 provide an effective seal against flow of the electrolyte from any given cell to an adjacent cell. This confinement of the electrolyte thus prevents undesired electrochemical action between electrolyte-anode wafer 19 and current collecting members 22, 23, 24 and 25.

As shown in Fig. 2, in the assembly of each cell the depending flanges 20 of the barrier between the electrolyte-anode wafer 19 extend downwardly to a point coextensive with the edges of membrane 18. Above each barrier and extending outwardly beyond each barrier are the current collecting members 22, 23, 24 and 25. In cross section there is a triangular-shaped space between the extension of the current collecting members and the depending flanges 20. When assembling a battery the cells are first placed in a pile and held in position by compression. The pile is then coated with a material which will solidify to form casing 27. When the pile is coated the material which forms the casing flows into the above-mentioned triangular-shaped spaces and thus interlocks the cells, as well as providing a more rigid type of casing construction.

While there has been shown and described what is at present considered to be the preferred embodiment of the present invention, it will be obvious to those skilled in the art that various modifications and substitutions of equivalents may be made without departing from the teachings of the invention.

Having thus described my invention, I claim:

1. A battery comprising a stack of cells adjacently positioned, wherein each cell consists of a combined cathode and depolarizer of relatively thin flat shape; a dialysis membrane coextensive with and extending across the active face of the cathode-depolarizer; a combined electrolyte and anode wafer smaller in width and length than the cathode-depolarizer and in contact with the dialysis membrane in the central portion of its area; together with an imperforate metal barrier between each cell of the battery: said barrier having a flat surface coextensive with the electrolyte-anode wafer, and a continuous imperforate edge flange on the barrier extending angularly outwardly and downwardly from the flat portion of the barrier to the marginal edges of the dialysis layer and cathode-depolarizer providing a serrated external surface on the stack of cells; together with a casing having wall surfaces interlocking with the serrated external surfaces of the stack of cells to provide a rigid casing.

2. A battery comprising a stack of cells adjacently positioned, wherein each cell consists of a combined cathode and depolarizer of relatively thin flat shape; a dialysis membrane coextensive with and extending across the active face of the cathode depolarizer; a combined electrolyte and anode wafer smaller in width and length than the cathode-depolarizer and in contact with the dialysis membrane in the central portion of its area; together with an imperforate metal barrier between each cell of the battery: said barrier having a flat surface coextensive with the electrolyte-anode wafer, and a continuous imperforate edge flange on the barrier extending outwardly and downwardly from the flat portion of the barrier to the marginal edges of the dialysis layer and cathode-depolarizer to define an internal space within each cell of the battery and present electrolyte creepage between individual cells.

3. A battery comprising a stack of cells adjacently positioned, wherein each cell consists of a combined cathode and depolarizer of relatively thin flat shape; a dialysis membrane coextensive with and extending across the active face of the cathode depolarizer; a combined electrolyte and anode wafer smaller in width and length than the cathode-depolarizer and in contact with the dialysis membrane in the central portion of its area; together with an imperforate metal barrier between each cell of the battery: said barrier extending across the electrolyte-anode wafer and the cathode-depolarizer and having an imperforate marginal edge flange extending outwardly to the outer edges of the dialysis layer, the anode-electrolyte, and the cathode-depolarizer to prevent electrolyte creepage between individual cells.

LA VERN EDWARD QUINNELL.

REFERENCES CITED

The following references are of record in the file of this patent:

UNITED STATES PATENTS

| Number | Name | Date |
|---|---|---|
| 1,737,130 | Storey et al. | Nov. 26, 1929 |
| 1,797,161 | Strohl et al. | Mar. 17, 1931 |
| 2,144,574 | MacCallam | Jan. 17, 1939 |
| 2,307,627 | Lawson | Jan. 5, 1944 |

FOREIGN PATENTS

| Number | Country | Date |
|---|---|---|
| 540,591 | Great Britain | Oct. 22, 1941 |

Certificate of Correction

Patent No. 2,483,983                                                                                                          October 4, 1949

LA VERN EDWARD QUINNELL

It is hereby certified that errors appear in the printed specification of the above numbered patent requiring correction as follows:

Column 4, line 21, for the word "present" read *prevent*; line 52, list of references cited, for "Jan. 5, 1944" read *Jan. 5, 1943*;

and that the said Letters Patent should be read with these corrections therein that the same may conform to the record of the case in the Patent Office.

Signed and sealed this 14th day of February, A. D. 1950.

[SEAL]

THOMAS F. MURPHY,
*Assistant Commissioner of Patents.*